United States Patent
Chau et al.

(10) Patent No.: US 10,396,650 B2
(45) Date of Patent: Aug. 27, 2019

(54) DC-DC CONVERTER FOR CONTROLLING AN AIRCRAFT FAN INVERTER, AND ASSOCIATED CONTROL METHOD AND FAN

(71) Applicant: SAFRAN ELECTRICAL & POWER, Blagnac (FR)

(72) Inventors: Valery Chau, Evry (FR); Philippe Preciat, Gourdan (FR); Pascal Rollins, Daux (FR); Sonia Dhokkar, Brunoy (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 0 days.

(21) Appl. No.: 15/580,155

(22) PCT Filed: Jun. 7, 2016

(86) PCT No.: PCT/FR2016/051361
§ 371 (c)(1),
(2) Date: Dec. 6, 2017

(87) PCT Pub. No.: WO2016/198783
PCT Pub. Date: Dec. 15, 2016

(65) Prior Publication Data
US 2018/0138800 A1    May 17, 2018

(30) Foreign Application Priority Data
Jun. 11, 2015    (FR) ..................... 15 55330

(51) Int. Cl.
*H02M 1/00*    (2006.01)
*H02M 1/08*    (2006.01)
(Continued)

(52) U.S. Cl.
CPC ............ *H02M 1/083* (2013.01); *H02M 3/337* (2013.01); *B64D 13/00* (2013.01); *H02M 1/38* (2013.01);
(Continued)

(58) Field of Classification Search
CPC .......... H02M 1/00; H02M 1/083; H02M 1/38; H02M 2001/0067; H02M 2001/007; H02M 2001/008; Y02B 70/1491
(Continued)

(56) References Cited

U.S. PATENT DOCUMENTS

| | | | |
|---|---|---|---|
| 4,829,415 | A | 5/1989 | Haferl |
| 5,181,160 | A | 1/1993 | Okamoto et al. |

(Continued)

FOREIGN PATENT DOCUMENTS

DE    102011078579    1/2013

OTHER PUBLICATIONS

International Search Report with English Language Translation and Written Opinion, dated Sep. 23, 2016, Application No. PCT/FR2016/051361.

(Continued)

*Primary Examiner* — William Hernandez
(74) *Attorney, Agent, or Firm* — Womble Bond Dickinson (US) LLP

(57) ABSTRACT

The invention relates to an electric DC-DC converter suitable for being supplied with power by a primary voltage source and for supplying control electronics of a three-phase inverter with power, said three-phase inverter being configured to control a fan of a ventilation system of an aircraft. The DC-DC converter is characterised in that it comprises a transformer (16), a primary circuit (12) comprising two loops forming a symmetrical assembly, at least one secondary circuit (14) comprising a secondary winding ($L_S$), suit- (Continued)

able for supplying, firstly, the inverter with an output voltage equal to twice the peak voltage at the terminals of the secondary winding ($L_S$) and, secondly, a branch of the circuit suitable for supplying the inverter with an output voltage equal to the opposite of the peak voltage at the terminals of the secondary winding ($L_S$), and in that the controllable transistors (M1, M2) are suitable for each being switched at zero voltage.

7 Claims, 2 Drawing Sheets

(51) Int. Cl.
*H02M 3/337* (2006.01)
*H02M 1/38* (2007.01)
*H02M 7/10* (2006.01)
*B64D 13/00* (2006.01)

(52) U.S. Cl.
CPC ...... *H02M 7/103* (2013.01); *H02M 2001/007* (2013.01); *H02M 2001/008* (2013.01); *H02M 2001/0058* (2013.01); *H02M 2001/0067* (2013.01); *Y02B 70/1491* (2013.01)

(58) Field of Classification Search
USPC .............................................. 307/9.1, 43, 82
See application file for complete search history.

(56) References Cited

U.S. PATENT DOCUMENTS

| | | | |
|---|---|---|---|
| 5,568,226 A | 10/1996 | Kusano | |
| 5,790,391 A * | 8/1998 | Stich | H02J 9/062 307/64 |
| 6,166,927 A * | 12/2000 | Farrington | H02M 3/337 363/25 |
| 8,885,366 B2 * | 11/2014 | Yu | H02M 3/337 363/24 |
| 2005/0024901 A1 * | 2/2005 | Ying | H02M 3/33569 363/24 |
| 2006/0139970 A1 | 6/2006 | Cheng | |
| 2011/0261590 A1 * | 10/2011 | Liu | H02M 1/4225 363/17 |
| 2012/0187869 A1 | 7/2012 | Angelin et al. | |
| 2014/0022826 A1 * | 1/2014 | He | H02M 3/3372 363/25 |
| 2014/0167661 A1 * | 6/2014 | van der Merwe | H02M 3/33507 318/400.3 |
| 2015/0009716 A1 * | 1/2015 | Suzuki | H02M 3/33569 363/21.02 |

OTHER PUBLICATIONS

"Primary-Side Push-Pull Oscillator with Dead-Time Control", Retrieved from the Internet <http://www.ti.com/lit/ds/symlink/ucc28089.pdf>, Aug. 31, 2006, 23 pages.

* cited by examiner

DC-DC CONVERTER FOR CONTROLLING AN AIRCRAFT FAN INVERTER, AND ASSOCIATED CONTROL METHOD AND FAN

1. TECHNICAL FIELD OF THE INVENTION

The invention relates to the optimisation of an electric DC-DC converter structure. In particular, the invention relates to an electric DC-DC converter intended for controlling a three-phase inverter, in particular a three-phase inverter controlling a fan of a ventilation system of an aircraft.

2. TECHNOLOGICAL BACKGROUND

Ventilation systems for regulating air circulation within an aircraft comprise at least one fan suitable for circulating air in the aircraft, in particular in the aircraft cabin. Each fan is controlled by a three-phase inverter. The three-phase inverter comprises three power supply arms, with each of these arms comprising two insulated-gate bipolar transistors (IGBT). The voltage requirements for controlling IGBT transistors are conventionally +15 V of positive-bias voltage and −7.5 V of negative-bias voltage. These voltages are supplied by at least one DC-DC (Direct Current-Direct Current) converter and generally one converter per IGBT transistor.

However, new generations of fans have been developed, the mass and volume of which have been significantly reduced. Therefore, in order to benefit from these reductions in mass and volume, suitable DC-DC converters need to be used. In particular, the DC-DC converters that are currently used have a significant spatial requirement and weight and a large number of components. Therefore, they are no longer suitable for the new generations of fans for which the space reserved for installing the DC-DC converter is reduced. Furthermore, due to the reduction of this space, new thermal constraints arise, for which the current DC-DC converters are not suitable as their output is too low and causes thermal heating that is unacceptable in this reduced space.

Therefore, a new type of DC-DC converter needs to be proposed that is suitable for the new generations of fans for aircraft ventilation systems.

3. AIMS OF THE INVENTION

The aim of the invention is to overcome at least some of the drawbacks of the known DC-DC converters.

In particular, the aim of the invention is to provide, in at least one embodiment of the invention, a DC-DC converter comprising a reduced number of components.

A further aim of the invention is to provide, in at least one embodiment of the invention, a DC-DC converter comprising few complex components.

A further aim of the invention is to provide, in at least one embodiment of the invention, a DC-DC converter having a reduced spatial requirement and weight.

A further aim of the invention is to provide, in at least one embodiment of the invention, a DC-DC converter having a high output.

A further aim of the invention is to provide, in at least one embodiment of the invention, a DC-DC converter with reduced heating.

4. DISCLOSURE OF THE INVENTION

To this end, the invention relates to an electric DC-DC converter suitable for being supplied with power by a primary voltage source and for supplying control electronics of a three-phase inverter with power, said three-phase inverter being configured to control a fan of a ventilation system of an aircraft, characterised in that said converter comprises:

transformer comprising two primary windings and at least one secondary winding;

a primary circuit comprising a power supply input suitable for being connected to a first terminal of the primary voltage source, said power supply input being connected to two switching loops each comprising one of the primary windings of the transformer and a controllable transistor having a parasitic capacitance and thus forming a symmetrical assembly;

at least one secondary circuit comprising a secondary winding of the transformer, said secondary winding comprising two terminals connected, firstly, to a capacitive rectifier bridge suitable for supplying the control electronics of the inverter with a positive output voltage equal to twice the peak voltage at the terminals of the secondary winding and, secondly, to a branch of the circuit suitable for supplying the control electronics of the inverter with a negative output voltage equal to the opposite of the peak voltage at the terminals of the secondary winding, and in that the controllable transistors are suitable for each being controlled by a control signal between an on-state and an off-state, such that when one controllable transistor is in an on-state, the other controllable transistor is in an off-state and such that when a controllable transistor is switched from the on-state to the off-state, the two controllable transistors are kept in the off-state during a dead time so as to effect zero-voltage switching.

Throughout the remainder of the description, the control voltage of a transistor denotes the voltage between the gate and the source for a field-effect transistor, the output voltage at the terminals of a transistor denotes the voltage between the drain and the source for a field-effect transistor, and the current passing through the transistor denotes the current between the drain and the source for a field-effect transistor. The on-state of the controllable transistors corresponds to a state in which a current is passing through the transistor, and the off-state of the controllable transistors corresponds to a state in which the current passing through the transistor is zero or negligible. Therefore, the controllable transistors act as controllable switches having a parasitic capacitance in parallel, with the on-state corresponding to a closed switch and the off-state corresponding to an open switch.

A DC-DC converter according to the invention thus allows control electronics of a three-phase inverter to be controlled by a reduced number of components. In particular, the primary circuit comprises a symmetrical assembly (also referred to as a push-pull assembly) comprising only two transistors instead of four transistors in the full-bridge structures that are commonly used. Furthermore, the structure of the secondary circuit of the DC-DC converter allows two output voltages of the secondary circuit to be obtained by means of a single secondary winding. Besides the primary and secondary windings, the DC-DC converter does not comprise any magnetic components, which generally have a significant spatial requirement. The DC-DC converter according to the invention therefore has a lower spatial requirement than the current solutions.

The primary circuit comprises a symmetrical assembly that is controlled so as to effect zero-voltage switching (ZVS) of the controllable transistors. Therefore, each controllable transistor is alternately in an on-state or an off-state;

however, when a controllable transistor passes from the on-state to the off-state, the other controllable transistor remains in the off-state during a dead time, then passes to the on-state. This dead time is a time interval that allows switching losses to be minimised that are due, in the prior art, to a voltage-current switch at non-zero values. The dead time during which the two transistors are off allows a voltage-current switch at very low values, resulting in very low switching losses. Therefore, the output of the DC-DC converter is improved, and heating is reduced.

The zero-voltage switching is provided during the dead time and by a particular combination of the primary windings and the parasitic capacitances of the controllable transistors. A first controllable transistor is in the off-state, the voltage at its terminals is at its maximum level and its parasitic capacitance is charged, a second controllable transistor is in the on-state, the voltage at its terminals is at its minimum level and its parasitic capacitance is discharged. During the dead time, the two transistors are in the off-state and the primary windings are no longer supplied with current by the primary voltage source. A magnetising current from the transformer allows the parasitic capacitance of the first controllable transistor to be discharged and the parasitic capacitance of the second controllable transistor to be charged. Once this charging and discharging of the parasitic capacitances is complete, switching can occur without losses: indeed, the transistor comprises a diode that is spontaneously energised during the dead time. The primary windings and the controllable transistors are therefore selected such that their characteristics allow zero-voltage switching. In particular, the parasitic capacitances of the transistors, the magnetising current and the duration of the dead time are selected so as to obtain zero-voltage switching without adding components.

The DC-DC converter according to the invention is therefore, in particular by virtue of the combination of a push-pull assembly, a capacitive rectifier bridge and zero-voltage switching, perfectly suited to the constraints of the new generations of fans for a ventilation system of an aircraft, in particular in terms of spatial requirement, weight and thermal efficiency. Furthermore, its cost is reduced.

Advantageously and according to the invention, with the three-phase inverter comprising a plurality of insulated-gate bipolar transistors, the electric DC-DC converter is characterised in that it comprises a plurality of secondary circuits each comprising a secondary winding of the transformer, each secondary circuit being suitable for supplying at least one insulated-gate bipolar transistor of the control electronics of the three-phase inverter with power.

According to this aspect of the invention, the DC-DC converter allows a plurality of insulated-gate bipolar transistors of the three-phase inverter to be supplied with power by a single primary power supply source. With each insulated-gate bipolar transistor of the three-phase inverter requiring a secondary winding to obtain a positive and negative voltage, duplicating the number of secondary windings on the same transformer allows a complete three-phase inverter to be controlled, which allows a reduction in the spatial requirement, the weight and the price of all the DC-DC converters required to control a fan.

Advantageously and according to the invention, the controllable transistors are field-effect transistors.

Preferably, the controllable transistors of the DC-DC converter are metal-oxide-gate field-effect transistors (also referred to as MOSFETs (Metal-oxide semiconductor field-effect transistor)). Other components may also be used, subject to them being supplemented by a freewheeling diode.

The invention further relates to a fan for an aircraft system, characterised in that said fan is controlled by a three-phase inverter comprising control electronics suitable for being supplied with power by at least one electric DC-DC converter according to the invention.

Advantageously, and according to this latter aspect of the invention, the control electronics of the three-phase inverter comprise three power supply arms, each arm being controlled by an electric DC-DC converter according to the invention.

Advantageously and according to the invention, the control electronics of the three-phase inverter comprise three power supply arms, and said electronics comprise an electric converter according to the invention comprising six secondary circuits suitable for controlling the three power supply arms.

The invention further relates to a method for controlling an electric DC-DC converter according to the invention, characterised in that said method comprises controlling the two controllable transistors, referred to as the first controllable transistor and the second controllable transistor, according to the following steps:
  a first step of controlling the first controllable transistor in the on-state and the second controllable transistor in the off-state;
  a second step of transitioning the first controllable transistor to the off-state and of keeping the second controllable transistor in the off-state during the dead time;
  a third step of controlling the second controllable transistor in the on-state and the first controllable transistor in the off-state;
  a fourth step of transitioning the second controllable transistor to the off-state and of keeping the first controllable transistor in the off-state during the dead time.

The method according to the invention thus allows control of the DC-DC converter comprising two transitioning steps, in which the two transistors are in an off-state in order to allow zero-voltage switching.

The invention further relates to an electric DC-DC converter, to a fan and to a control method, characterised in combination by all or some of the features mentioned above or hereafter.

5. LIST OF DRAWINGS

Further aims, features and advantages of the invention will become apparent upon reading the following description, which is given solely by way of non-limiting example and with reference to the accompanying drawings, in which.

6. DETAILED DESCRIPTION OF AN EMBODIMENT OF THE INVENTION

Figure 1:
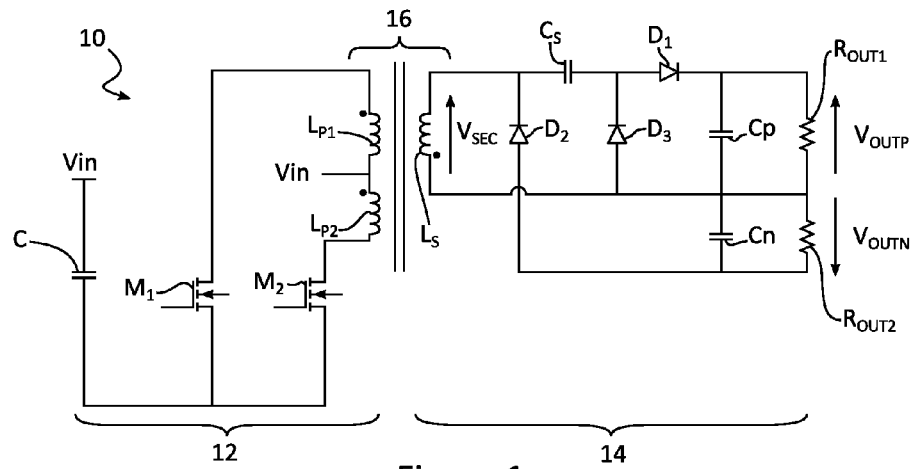
FIG. 1 is a schematic view of an electric DC-DC converter according to a first embodiment of the invention.

The following embodiments are examples. Even though the description refers to one or more embodiments, this does not necessarily mean that each reference relates to the same embodiment or that the features apply only to a single embodiment. Mere features of different embodiments may also be combined to provide other embodiments. In the drawings, the scales and the proportions are not strictly observed for the sake of illustration and of clarity.

FIG. 1 is a schematic view of an electric DC-DC converter 10 according to a first embodiment. The DC-DC converter 10 comprises a primary circuit 12, a secondary circuit 14 and a transformer 16. The transformer 16 forms the link between the primary circuit 12 and the secondary circuit 14. In particular, the transformer 16 comprises two perfectly coupled primary windings, namely a first primary winding $L_{P1}$ and a second primary winding $L_{P2}$, and a secondary winding $L_S$. The primary windings $L_{P1}$ and $L_{P2}$ form part of the primary circuit 12, and the secondary winding $L_S$ forms part of the secondary circuit 14.

The primary circuit 12 is supplied with power by a primary voltage source, the terminals of which are each connected to a power supply input $V_{IN}$ so as to supply the DC-DC converter 10 with power. The power supply input $V_{IN}$ is connected to two parallel switching loops, namely a first loop and a second loop. The first loop comprises the first primary winding $L_{P1}$ and a first controllable transistor $M_1$, and the second loop comprises the second primary winding $L_{P2}$ and a second controllable transistor $M_2$. The two loops thus form a symmetrical assembly, also referred to as a push-pull assembly.

The power supplied by the primary circuit 12 to the two primary windings is transferred to the secondary circuit 14 via the transformer 16: the secondary winding $L_S$ recovers a ratio of the primary voltage present at the two primary windings. In particular, the secondary winding $L_S$ has a voltage $V_{SEC}$ at its terminals. The terminals of the secondary winding $L_S$ are connected, firstly, to a first branch comprising a capacitive rectifier bridge, comprising two capacitors $C_S$ and $C_P$ and two diodes $D_1$ and $D_3$ forming an assembly referred to as a Schenkel doubler, and, secondly, to a second branch comprising a diode $D_2$ and a capacitor $C_N$. The capacitor $C_S$ acts as a capacitive doubler.

The first branch is suitable for supplying an item of equipment, in this case represented by a resistor $R_{OUT1}$, with a first output voltage $V_{OUTP}$ equal to twice the peak voltage at the terminals of the secondary winding $L_S$. Indeed, as can be seen in FIG. 1, the voltage $V_{OUTP}$ is equal to the sum of the voltage $V_{SEC}$, of the voltage at the terminals of the capacitor $C_S$ and of the voltage at the terminals of the diode $D_1$. However, the voltage at the terminals of the capacitor $C_S$ is equal to the sum of the voltage $V_{SEC}$ and of the voltage at the terminals of the diode $D_3$. By disregarding the voltages of the diodes $D_1$ and $D_3$, $V_{OUTP}=2\times V_{SEC}$ is obtained.

The second branch is suitable for supplying an item of equipment, in this case represented by a resistor $R_{OUT2}$, with a second output voltage $V_{OUTN}$ equal to the opposite of the peak voltage at the terminals of the secondary winding $L_S$. Indeed, as can be seen in FIG. 1, the output voltage $V_{OUTN}$ is equal to the sum of the opposite of the voltage $V_{SEC}$ and of the voltage at the terminals of the diode $D_2$. By disregarding the voltage of the diode $D_2$, $V_{OUTN}=-V_{SEC}$ is obtained.

By setting $V_{SEC\ peak}=7.5$ V, then $V_{OUTP}=15$ V and $V_{OUTN}=-7.5$ V are thus obtained, corresponding to the bias voltages that are generally required for IGBT transistors that are used in three-phase inverters. For different voltage requirements, other values can be obtained by setting the number of turns of the secondary winding accordingly.

FIG. 2a, 2b, 2c, 2d show an electric DC-DC converter 10 according to the first embodiment of the invention during various steps of a method according to one embodiment of the invention. These figures show in greater detail the operation of the DC-DC converter 10 according to various steps associated with the states of the two controllable transistors $M_1$, $M_2$. In these figures, the controllable transistors $M_1$, $M_2$ are each represented, for the sake of simplification and clarity, by a closed switch (representing a controllable transistor in the on-state) or an open switch (representing a controllable transistor in the off-state), at the terminals of which a parasitic capacitance of each controllable transistor is connected in parallel, namely a first parasitic capacitance $C_{DS1}$ of the first controllable transistor $M_1$ and a second parasitic capacitance $C_{DS2}$ of the second controllable transistor $M_2$.

The method comprises the following steps:

- a first step of controlling the first controllable transistor $M_1$ in the on-state and the second controllable transistor $M_2$ in the off-state;
- a second step of transitioning the first controllable transistor $M_1$ to the off-state and of keeping the second controllable transistor $M_2$ in the off-state during a dead time;
- a third step of controlling the second controllable transistor $M_2$ in the on-state and the first controllable transistor $M_1$ in the off-state;
- a fourth step of transitioning the second controllable transistor $M_2$ to the off-state and of keeping the first controllable transistor $M_1$ in the off-state during a dead time.

Figure 2A:
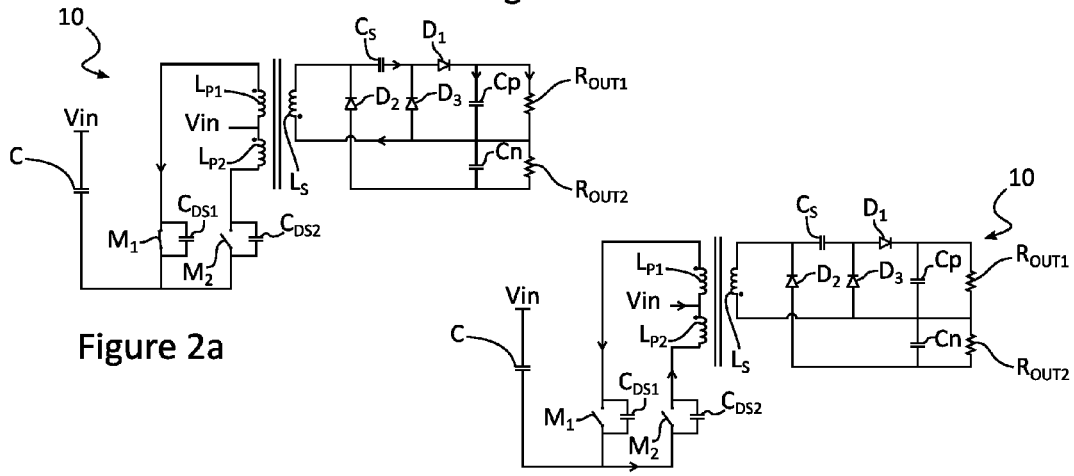
FIGS. 2a, 2b, 2c and 2d are schematic views of an electric DC-DC converter according to the first embodiment of the invention during various steps of a method according to one embodiment of the invention.
Figure 2B:
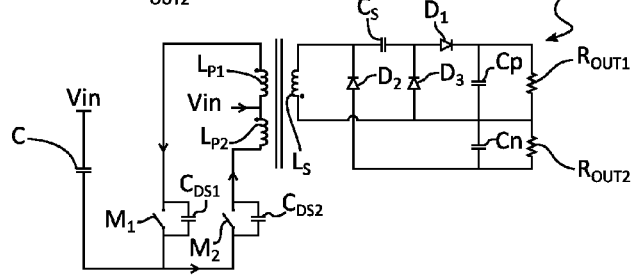
Figure 2C:
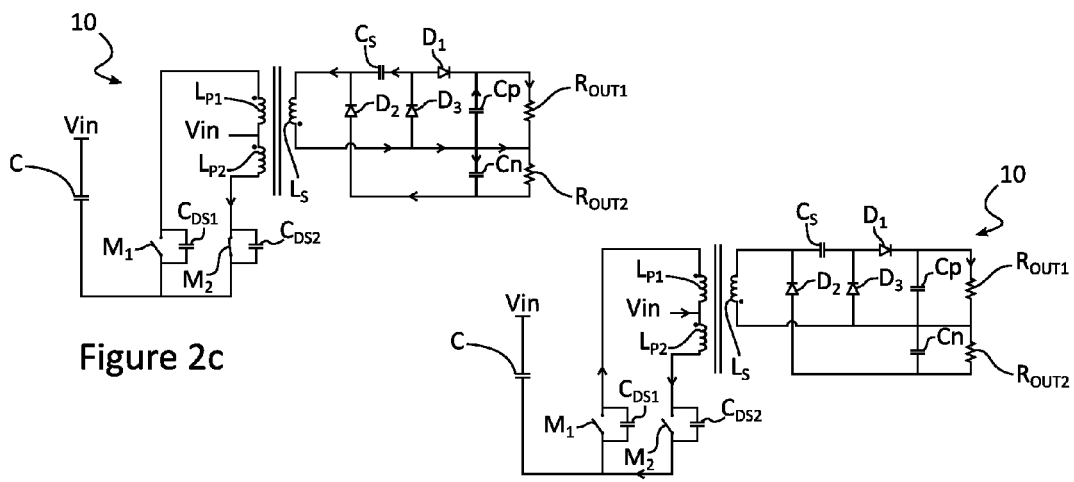

FIGS. 2a and 2c show the DC-DC converter 10 during the first step and the third step, respectively, in which one controllable transistor is in the on-state and the other controllable transistor is in the off-state.

The push-pull assembly of the primary circuit alternately supplies the first primary winding $L_{P1}$ or the second primary winding $L_{P2}$ with power. Therefore, the current flowing in the secondary winding $L_S$ changes direction depending on the primary winding supplied with power. The first primary winding $L_{P1}$ is supplied with power by the push-pull assembly when the first controllable transistor $M_1$ is in the on-state and the second controllable transistor $M_2$ is in the off-state, as shown with reference to FIG. 2a. The second primary winding $L_{P2}$ is supplied with power when the first controllable transistor $M_1$ is in the off-state and the second controllable transistor $M_2$ is in the on-state, as shown with reference to FIG. 2c.

A first charging current passing through the resistor $R_{OUT1}$ and a second charging current passing through the resistor $R_{OUT2}$ are supplied differently depending on the direction of the current passing through the secondary winding $L_S$. When the second primary winding $L_{P2}$ is supplied with power, as shown with reference to FIG. 2c, the capacitor $C_S$ charges up to $V_{SEC\ peak}$, the capacitor $C_P$ supplies the first charging current, the capacitor $C_N$ is charged up to $V_{SEC\ peak}$ and the secondary winding $L_S$ supplies the second charging current. When the first primary winding $L_{P1}$ is supplied with power, as shown with reference to FIG. 2a, the capacitor $C_S$ discharges into the capacitor $C_P$ and supplies the first charging current, the capacitor $C_N$ supplies the second charging current.

Figure 2D:
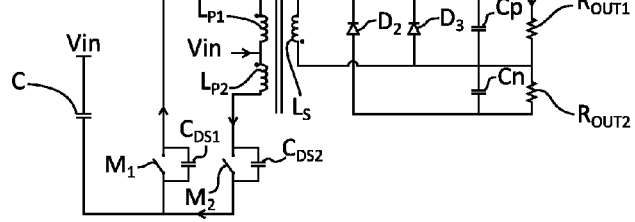

FIGS. 2b and 2d show the DC-DC converter 10 during the second step and the fourth step, respectively, in which the two controllable transistors are in the off-state.

These steps are transitioning steps that allow zero-voltage switching to be obtained by keeping the two controllable transistors in the off-state during a dead time.

The second step follows the first step, in which the first controllable transistor $M_1$ was on. Therefore, at the start of the second step, the first parasitic capacitance $C_{DS1}$ of the first controllable transistor $M_1$ is discharged and the output voltage at the terminals of the first controllable transistor $M_1$ is at its minimum level, i.e. close to zero. With the second controllable transistor $M_1$ being off in the first step and the second step, the second parasitic capacitance $C_{DS2}$ of the second controllable transistor $M_2$ is charged and the output voltage at the terminals of the second controllable transistor $M_2$ is at its maximum level. The two primary windings are no longer supplied with power by the primary voltage source and a magnetising current propagates in the direction indicated by the arrows on the two loops in FIG. 2b. This magnetising current causes the charging of the first parasitic capacitance $C_{DS1}$ and the discharging of the second parasitic capacitance $C_{DS2}$. Thus, the output voltage at the terminals of the first controllable transistor $M_1$ progressively rises, and the output voltage at the terminals of the second controllable transistor $M_2$ progressively falls. In order to set the rising or falling speed of the voltages, the parasitic capacitance is only formed by that of the controllable transistor.

Similarly, in the fourth step shown with reference to FIG. 2d, the first parasitic capacitance $C_{DS1}$ discharges, the output voltage at the terminals of the first controllable transistor $M_1$ progressively falls, the second parasitic capacitance $C_{DS2}$ charges and the output voltage at the terminals of the second controllable transistor $M_2$ progressively rises.

The second step and the fourth step last for a predefined dead time that depends on the characteristics of the primary windings and the parasitic capacitances, such that at the end of the dead time, the voltages at the terminals of the controllable transistors reach the maximum value if the peak voltage rises during the step or the minimum value if the voltage falls during the step.

In practice, the optimum dead time $T_M$ for optimum zero-voltage switching of a controllable transistor is expressed using the following formula:

$$T_M = \sqrt{T_{ON}^2 + 8C_{DS}*L_P} - T_{ON}$$

Where $T_{ON}$ is the time that the controllable transistor is controlled in the on-state, $C_{DS}$ is the parasitic capacitance of the controllable transistor, and $L_P$ is the inductance of the primary winding located in the same loop as the controllable transistor in question.

Figure 3:
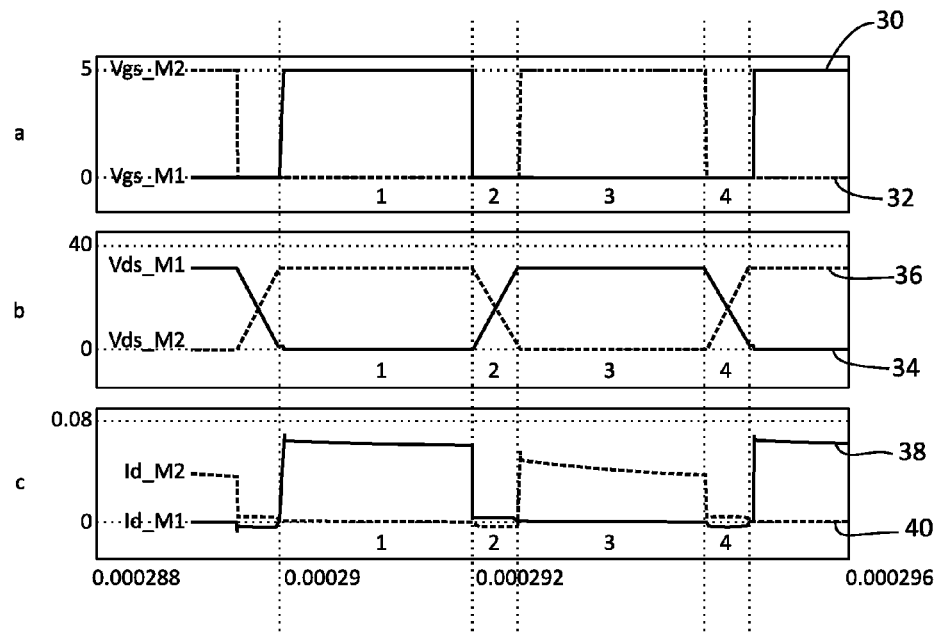
FIG. 3 shows curves a, b, c showing, respectively, the voltages for controlling the controllable transistors, the voltages at the terminals of the controllable transistors and the intensities passing through the controllable transistors of an electric DC-DC converter according to the first embodiment of the invention.

FIG. 3 shows three curves a, b and c showing, respectively, as a function of time, the voltages $V_{gs\_M1}$ and $V_{gs\_M2}$ for controlling the first controllable transistor $M_1$ and the second controllable transistor $M_2$ (curves 30 and 32), respectively, the output voltages $V_{ds\_M1}$ and $V_{ds\_M2}$ at the terminals of the first controllable transistor $M_1$ and the second controllable transistor $M_2$ (curves 34 and 36), respectively, and the intensities $I_{d\_M1}$ and $I_{d\_M2}$ passing through the first controllable transistor $M_1$ and the second controllable transistor $M_2$ (curves 38 and 40), respectively, of an electric DC-DC converter according to the first embodiment of the invention.

The solid curves 30, 34, 38 relate to the first controllable transistor $M_1$, and the dashed curves 32, 36, 40 relate to the second controllable transistor $M_2$.

The time regions numbered 1, 2, 3 and 4 correspond to the first step, the second step, the third step and the fourth step, respectively, of the control method according to the invention. The curve a thus represents the control operations sent to the controllable transistors, the upper level representing controlling the controllable transistor in the on-state, and the lower level representing controlling the controllable transistor in the off-state. The commands are transmitted, for example, by a dedicated circuit (not shown) or by an existing control card, for example, an FPGA.

During the first step, in time region 1, the first controllable transistor $M_1$ is controlled in the on-state: the output voltage $V_{ds\_M1}$ at its terminals is therefore zero, and the intensity $I_{d\_M1}$ of the current passing through said transistor is non-zero. The second controllable transistor $M_2$ is controlled in the off-state: the output voltage $V_{ds\_M2}$ at its terminals is therefore non-zero, and the intensity $I_{d\_M2}$ of the current passing through said transistor is zero (or negligible).

During the second step, in time region 2, which is of equal duration to the previously described dead time, the two controllable transistors are controlled in the off-state: the output voltage $V_{ds\_M1}$ at the terminals of the first controllable transistor $M_1$ progressively rises due to the charging of the first parasitic capacitance $C_{DS1}$, and the output voltage at the terminals of the second controllable transistor $M_2$ falls due to the discharging of the second parasitic capacitance $C_{DS2}$. The intensities of the currents passing through the controllable transistors are close to zero, corresponding to the magnetising currents passing through the parasitic capacitances. At the start of the dead time, the intensity $I_{d\_M1}$ of the current passing through the first controllable transistor $M_1$ is brought to zero or a negligible value before the progressive rise of the output voltage $V_{ds\_M1}$ at the terminals of the first controllable transistor $M_1$. Therefore, there are no losses as a result of switching the first controllable transistor $M_1$ from the on-state to the off-state at the end of the first step. At the end of the dead time, the intensity $I_{d\_M2}$ of the current passing through the second controllable transistor $M_2$ is zero or negligible, and the output voltage $V_{ds\_M2}$ at the terminals of the second controllable transistor $M_2$ has gradually reached zero or a negligible value. Therefore, there are no losses as a result of switching the second controllable transistor $M_2$ from the off-state to the on-state at the start of the third step. The switching operations of the two controllable transistors therefore involve zero-voltage switching (ZVS).

The third step and the fourth step are similar to the first and second steps, with the role of the two controllable transistors being reversed.

By virtue of this zero-voltage switching, the output of the DC-DC converter according to the invention is more than 85% when the DC-DC converter is exposed to a temperature between −50° C. and 115° C., which is greater than the converters of the prior art.

Figure 4:
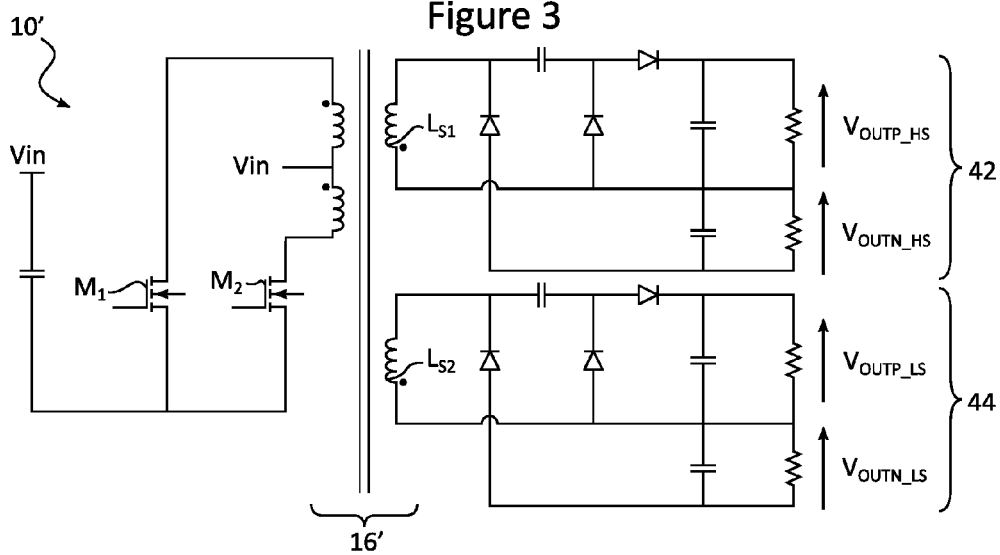
FIG. 4 is a schematic view of an electric DC-DC converter according to a second embodiment of the invention.

FIG. 4 is a schematic view of an electric DC-DC converter 10' according to a second embodiment. The DC-DC converter comprises, in the same way as the previously described first embodiment, a primary circuit and a first secondary circuit 42 comprising a first secondary winding, which supplies voltages $V_{OUTP\_HS}$ and $V_{OUTN\_HS}$.

In this embodiment, the DC-DC converter further comprises a second secondary circuit 44, identical to the first secondary circuit 42, comprising a second secondary winding. The transformer 16' thus comprises the two previously described primary windings, as well as the first secondary winding $L_{S1}$ and the second secondary winding $L_{S2}$. The second secondary winding 44 allows new output voltages to be obtained, namely a voltage $V_{OUTP\_LS}$ and a voltage $V_{OUTN\_LS}$, by means of a single primary circuit and a single primary power supply source. One possible use of these new output voltages is described hereafter with reference to FIG. 5.

Figure 5:
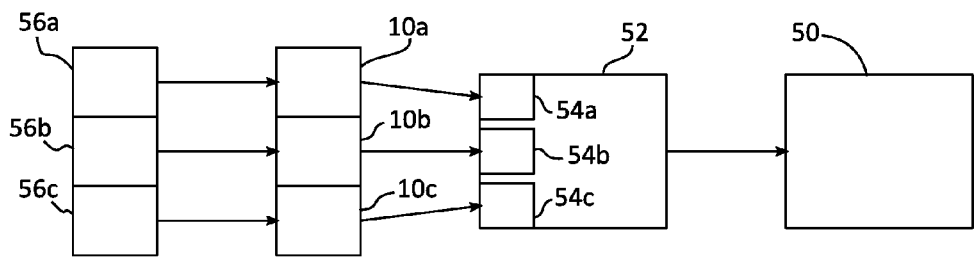
FIG. 5 is a schematic view of a power supply chain comprising three DC-DC converters according to the second embodiment of the invention and a fan according to one embodiment of the invention.

FIG. 5 shows a power supply chain comprising three DC-DC converters 10a, 10b, 10c according to the second embodiment of the invention and a fan 50 according to one embodiment of the invention. The fan 50 is supplied with power by a three-phase inverter 52 comprising three power supply arms 54a, 54b, 54c, the power supply arms 54a, 54b, 54c forming control electronics. Each power supply arm 54a, 54b, 54c comprises two IGBT transistors (not shown), a high-side (HS) IGBT transistor and a low-side (LS) IGBT transistor. In the prior art, each IGBT transistor of each branch had to be supplied with power by a DC-DC converter, the three-phase inverter thus being supplied with power by six DC-DC converters. In some solutions in the prior art, the three low-side IGBT converters are supplied with power by a single power supply, the three-phase inverter thus being supplied with power by four DC-DC converters. The DC-DC converter 10' according to the second embodiment previously described with reference to FIG. 4 allows the simultaneous power supply of a high-side IGBT transistor, by virtue of the output voltages $V_{OUTP\_HS}$ and $V_{OUTN\_HS}$, and a low-side IGBT transistor of a power supply arm, by virtue of the output voltages $V_{OUTP\_LS}$ and $V_{OUTN\_LS}$. The three-phase inverter thus requires only three DC-DC converters 10a, 10b, 10c.

Therefore, each power supply arm 54a, 54b, 54c is supplied with power by a DC-DC converter 10a, 10b, 10c, with each DC-DC converter 10a, 10b, 10c being supplied with power by a primary power supply source 56a, 56b, 56c.

According to an alternative embodiment (not shown), the DC-DC converter comprises six secondary circuits, thus allowing all the power supply arms of the control electronics of a three-phase inverter to be supplied with power.

The invention claimed is:

1. An electric DC-DC converter suitable for being supplied with power by a primary voltage source and for supplying control electronics of a three-phase inverter with power, said three-phase inverter being configured to control a fan of a ventilation system of an aircraft, wherein said converter comprises:
    a transformer comprising two primary windings and at least one secondary winding;
    a primary circuit comprising a power supply input suitable for being connected to a first terminal of the primary voltage source, said power supply input being connected to two switching loops each comprising one of the primary windings of the transformer and a controllable transistor having a parasitic capacitance and thus forming a symmetrical assembly;
    at least one secondary circuit comprising the at least one secondary winding of the transformer, said secondary winding comprising two terminals connected, firstly, to a capacitive rectifier bridge suitable for supplying the control electronics of the three-phase inverter with a positive output voltage equal to twice the peak voltage at the terminals of the secondary winding and, secondly, to a branch of the at least one secondary circuit suitable for supplying the control electronics of the three-phase inverter with a negative output voltage equal to the opposite of the peak voltage at the terminals of the secondary winding,
    and in that the controllable transistors are suitable for each being controlled by a control signal between an on-state and an off-state, such that when one controllable transistor is in the on-state, the other controllable transistor is in the off-state and such that when the one controllable transistor is controlled from the on-state to the off-state, the two controllable transistors are held in the off-state during a dead time so as to effect zero voltage switching.

2. The electric DC-DC converter according to claim 1, wherein the three-phase inverter comprises a plurality of insulated gate bipolar transistors, the electric DC-DC converter being characterised in that it comprises a plurality of secondary circuits each comprising a secondary winding of the transformer, each secondary circuit being suitable for supplying at least one insulated-gate bipolar transistor of the control electronics of the three-phase inverter with power.

3. The electric DC-DC converter according to claim 1, wherein the controllable transistors are field-effect transistors.

4. A fan of a ventilation system of an aircraft, wherein said fan is controlled by a three-phase inverter comprising control electronics supplied with power via at least one electric DC-DC converter according to claim 1.

5. The fan according to claim 4, wherein the control electronics of the three-phase inverter comprise three power supply arms, each arm being controlled by an electric DC-DC converter according to claim 1.

6. The fan according to claim 4, wherein the control electronics of the three-phase inverter comprise three power supply arms, and in that said control electronics comprise an electric DC-DC converter according to claim 1 comprising six secondary circuits suitable for controlling the three power supply arms.

7. A method for controlling an electric DC-DC converter according to claim 1, wherein said method comprises controlling the two controllable transistors, referred to as the first controllable transistor and the second controllable transistor, according to the following steps:
    a first step of controlling the first controllable transistor in the on-state and the second controllable transistor in the off-state;
    a second step of transitioning the first controllable transistor to the off-state and of keeping the second controllable transistor in the off-state during the dead time;
    a third step of controlling the second controllable transistor in the on-state and the first controllable transistor in the off-state;
    a fourth step of transitioning the second controllable transistor to the off-state and of keeping the first controllable transistor in the off-state during the dead time.

* * * * *